United States Patent
Sandstrom (10) Patent No.: US 8,782,665 B1
(45) Date of Patent: Jul. 15, 2014

(54) PROGRAM EXECUTION OPTIMIZATION FOR MULTI-STAGE MANYCORE PROCESSORS

(71) Applicant: Mark Henrik Sandstrom, Jersey City, NJ (US)

(72) Inventor: Mark Henrik Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 0 days.

(21) Appl. No.: 13/959,596

(22) Filed: Aug. 5, 2013

Related U.S. Application Data (60) Provisional application No. 61/804,660, filed on Mar. 23, 2013, provisional application No. 61/823,368, filed on May 14, 2013, provisional application No. 61/831,592, filed on Jun. 5, 2013, provisional application No. 61/839,304, filed on Jun. 25, 2013.

(51) Int. Cl.
  *G06F 13/00* (2006.01)
  *G06F 9/48* (2006.01)
  *G06F 9/54* (2006.01)

(52) U.S. Cl.
  CPC .............. *G06F 9/544* (2013.01); *G06F 9/4881* (2013.01)

USPC ............ 719/312; 370/237; 370/336; 370/389

(58) Field of Classification Search
  CPC ......... G06F 9/544; H04L 45/00; H04L 47/10; H04L 47/115
  See application file for complete search history.

(56) References Cited

U.S. PATENT DOCUMENTS

| | | | |
|---|---|---|---|
| 4,956,771 A | 9/1990 | Neustaedter | |
| 6,072,781 A | 6/2000 | Feeney et al. | |
| 7,760,625 B2 * | 7/2010 | Miyaho et al. | 370/229 |
| 2007/0153802 A1 * | 7/2007 | Anke et al. | 370/395.42 |
| 2010/0232396 A1 * | 9/2010 | Jing et al. | 370/336 |
| 2010/0287320 A1 | 11/2010 | Querol et al. | |
| 2011/0050713 A1 | 3/2011 | McCrary et al. | |
| 2011/0096667 A1 * | 4/2011 | Arita et al. | 370/237 |

FOREIGN PATENT DOCUMENTS

JP 06004314 A 1/1994

* cited by examiner

*Primary Examiner* — Andy Ho (57) ABSTRACT

An architecture for a multi-stage manycore processor shared dynamically among a set of software applications, with capabilities for destination task defined intra-application prioritization of inter-task communications (ITC), for architecture-based ITC performance isolation between the applications, as well as for prioritizing application task instances for execution on cores of manycore processors based at least in part on which of the task instances have available for them the input data, such as ITC data, that they need for executing.

20 Claims, 6 Drawing Sheets

PROGRAM EXECUTION OPTIMIZATION FOR MULTI-STAGE MANYCORE PROCESSORS

CROSS-REFERENCE TO RELATED APPLICATIONS

This application claims the benefit of the following applications, each of which is incorporated by reference in its entirety:

[1] U.S. Provisional Application No. 61/804,660, filed Mar. 23, 2013;
[2] U.S. Provisional Application No. 61/823,368, filed May 14, 2013;
[3] U.S. Provisional Application No. 61/831,592, filed Jun. 5, 2013; and
[4] U.S. Provisional Application No. 61/839,304, filed Jun. 25, 2013.

This application is also related to the following co-pending applications, each of which is incorporated by reference in its entirety:

[5] U.S. Utility application Ser. No. 13/184,028, filed Jul. 15, 2011;
[6] U.S. Utility application Ser. No. 13/270,194, filed Oct. 10, 2011;
[7] U.S. Utility application Ser. No. 13/277,739, filed Nov. 21, 2011;
[8] U.S. Utility application Ser. No. 13/684,473, filed Nov. 23, 2012;
[9] U.S. Utility application Ser. No. 13/717,649, filed Dec. 17, 2012;
[10] U.S. Provisional Application No. 61/764,521, filed Feb. 13, 2013;
[11] U.S. Utility application Ser. No. 13/901,566, filed May 24, 2013; and
[12] U.S. Utility application Ser. No. 13/906,159, filed May 30, 2013.

BACKGROUND

1. Technical Field

This invention pertains to the field of information processing, particularly to techniques for managing inter-task communications and resource allocation among tasks of software programs on parallel processing hardware.

2. Descriptions of the Related Art

Conventional microprocessor and computer system architectures rely mainly of system software for functions of providing inter-task communications (ITC) for an application program, performance isolation (if any actually performed) between different applications, and allocation of processing and communications capacity among pieces of the application programs. However, there are needs for processing systems to grow in their numbers of processors as well as processing cores per a processor, for such systems to get dynamically shared among increasing numbers of applications, as well as for individual applications to comprise increasing numbers of mutually communicating pieces such as threads, tasks and actors. Trying to scale conventional systems in these manners will be challenging, if feasible at all beyond certain practical limits, due at least in part to the performance limits of the software based implementations for the runtime functions per above as well as due to the increase in system software overhead caused by having to handle these runtime functions in software, and the need to do so under increasingly dynamic operating conditions, e.g. due to the movement toward networked utility or 'cloud' computing.

There thus is a need for innovations enabling scalable computing architectures supporting effective, low-overhead handling of ITC for application programs, providing performance isolation among the programs sharing dynamically a given pool of parallel processing hardware resources, including in terms of access to the system ITC capacity among the programs, and allocating processing resources among pieces of the programs.

SUMMARY

The invention provides methods and systems for intelligent, destination task defined prioritization of inter-task communications (ITC) for a computer program, for architectural ITC performance isolation among a set of programs running in parallel on a dynamically shared data processing platform, as well as for prioritizing instances of the program tasks for execution at least in part based on which of the instances have available to them their input data, including ITC data, enabling any such given instance to execute at the given time.

An aspect of the invention provides a hardware logic system for communications among tasks of a software program, with such a system comprising: 1) a collection of source task specific buffers for buffering communication units, called packets, directed to a given task, referred to as a destination task, of the program, and 2) hardware logic for selecting a buffer among the collection of buffers from which to transfer a next packet to the destination task, with the selecting done at least in part based on a priority rank for each of the buffers. Various embodiments of that system comprise further features such as: a) a feature wherein the priority rank for a given one of the buffers is based at least in part on a prioritization of a source task that the source buffer is specific to, with the prioritization assigned by the destination task; b) a feature wherein the priority rank for a given one of the buffers is based at least in part on a measure of a fill level of the buffer, with the measure of the fill level of the buffer comprising an indication of whether the buffer (i) is non-empty or (ii) has its fill level above a defined monitoring threshold; and/or c) hardware logic maintaining a hardware signal indicating whether communications to a given buffer, among the source task specific buffers, is permitted presently, with such logic setting the signal in a state indicating said communications being permitted when a fill level of the buffer is below a defined threshold, and with said signal being provided to that one of the tasks of the program for which the given buffer is specific to.

Another aspect of the invention provides a method for prioritizing communications among tasks of a software program. Such a method involves: 1) determining, for a given one of the tasks, referred to as a destination task, from which of the other tasks, referred to as source tasks, the destination task is expecting input data, and 2) assigning a prioritization for one or more of the source tasks, for purposes of transferring communications to the destination task, based at least in part on the determining. Various embodiments of this method provide further steps and features such as a) a feature whereby the assigning the prioritization is done in a manner selected from a set comprising: (i) setting a hardware signal associated with a given one of the source tasks to a state that represents the prioritization of the given source task, (ii) setting a hardware signal associated with a given one of the source tasks to a binary state that indicates whether or not the given source task has a high priority for the purposes of transferring communications to the destination task, and (iii) setting a hardware signal to a state that identifies which one of the source tasks has the highest priority for the purposes of transferring communications to the destination task; b) a feature whereby the assigning the prioritization involves writing, by the destination task, a value to a hardware device register associated with a given one of its source tasks, with said value specifying the prioritization of the given source task for purposes of sending communications to the destination task; c) a step of multiplexing communications data units to the destination task from source task specific buffers, wherein which of the source task specific buffers is selected as the one from which a next one of the data units is multiplexed to the destination task is determined at least in part based on the prioritizations of those of the source tasks that at that time have data at their associated buffers; d) a feature whereby the assigning is done according to which of the following classes, listed in their descending priority order, any given one of the source tasks belongs to: (1) source tasks from which new data is expected by the destination task, and (2) any other source tasks; and/or e) a feature wherein the other source tasks are further classified into the following subclasses, listed in their descending priority order: (i) tasks from which more data is allowed by the destination task, and (ii) any remaining tasks.

A yet another aspect of the invention provides a hardware logic system for prioritizing instances of a software program for execution. Such a system comprises: 1) hardware logic for determining which of the instances are ready to execute on an array of processing cores, at least in part based on whether a given one of the instances has available to it input data to process, and 2) hardware logic for assigning a subset of the instances for execution on the array of cores based at least in part on the determining. Various embodiments of that system include further features such as features whereby a) the input data is from a data source such that the given instance has assigned a high priority for purposes of receiving data; b) the input data is such data that it enables the given program instance to execute; c) the subset includes cases of none, some as well as all of the instances of said program; and/or d) the instance is: a task, a thread, an actor, or an instance any of the foregoing, or an independent copy of the given program.

A yet another aspect of the invention provides a hardware logic implemented method for prioritizing instances of a software program for execution, with such a method involving: 1) classifying instances of the program into the following classes, listed in their reducing execution priority order: (I) instances indicated as having high priority input data for processing, and (II) any other instances. Various embodiments of that method include further steps and features such as features whereby a) the other instances are further classified into the following sub-classes, listed in their reducing execution priority order: (i) instances indicated as able to execute presently without the high priority input data; and (ii) any remaining instances; b) the high priority input data is data that is from a source where its destination instance, of said program, is expecting high priority input data; c) a given instance of the program comprises tasks, with one of said tasks referred to as a destination task and others as source tasks of the given instance, and for the given instance, a unit of the input data is considered high priority if it is from such one of the source tasks that the destination task has assigned a high priority for inter-task communications to it; d) for any given one of the instances, a step of computing a number of its non-empty source task specific buffers among its input data buffers such that belong to source tasks of the given instance indicated at the time as high priority source tasks for communications to the destination task of the given instance, with this number referred to as an H number for its instance, and wherein, within the class I), the instances are prioritized for execution at least in part according to magnitudes of their H numbers, in descending order such that an instance with a greater H number is prioritized before an instance with lower H number; and/or e) in case of two or more of the instances tied for the greatest H number, such tied instances are prioritized at least in part according to their respective total numbers of non-empty input data buffers.

An aspect of the invention provides a system for processing a set of computer programs instances, with inter-task communications (ITC) performance isolation among the set of program instances. Such a system comprises: 1) a number of processing stages; and 2) a group of multiplexers connecting ITC data to a given stage among the processing stages, wherein a multiplexer among said group is specific to one given program instance among said set. The system hosts each task of the given program instance at different one of the processing stages, and supports copies of same task software code being located at more than one of the processing stages in parallel. Various embodiments of this system include further features such as a) a feature whereby at least one of processing stages comprises multiple processing cores such as CPU cores, with, for any of the cores, at any given time, one of the program instances assigned for execution; b) a set of source task specific buffers for buffering data destined for a task of the given program instance located at the given stage, referred to as a destination task, and hardware logic for forming a hardware signal indicating whether sending ITC is presently permitted to a given buffer among the source task specific buffers, with such forming based at least in part on a fill level of the given buffer, and with such signal being provided for a source task for which the given buffer is specific to; c) a feature providing, for the destination task, a set of source task specific buffers, wherein a given buffer is specific to one of the other tasks of the program instance for buffering ITC from said other task to the destination task; d) feature wherein the destination task provides ITC prioritization information for other tasks of the program instance located at their respective ones of the stages; d) a feature whereby the ITC prioritization information is provided by the destination task via a set of one or more hardware registers, with each register of the set specific to one of the other tasks of the program instance, and with each register configured to store a value specifying a prioritization level of the task that it is specific to, for purposes of ITC communications to the destination task; e) an arbitrator controlling from which source task of the program instance the multiplexer specific to that program instance will read its next ITC data unit; and/or f) a feature whereby the arbitrator prioritizes source tasks of the program instance for selection by the multiplexer to read its next ITC data unit based at least in part on at least one of: (i) source task specific ITC prioritization information provided by the destination task, and (ii) source task specific availability information of ITC data for the destination task from the other tasks of the program instance.

Accordingly, aspects of the invention involve application-program instance specific hardware logic resources for secure and reliable ITC among tasks of application program instances hosted at processing stages of a multi-stage parallel processing system. Rather than seeking to inter-connect the individual processing stages or cores of the multi-stage many-core processing system as such, the invented mechanisms efficiently inter-connect the tasks of any given application program instance using the per application program instance specific inter-processing stage ITC hardware logic resources. Due to the ITC being handled with such application program instance specific hardware logic resources, the ITC performance experience by one application instance does not depend on the ITC resource usage (e.g. data volume and inter-task communications intensiveness) of the other applications sharing the given data processing system per the invention. This results in effective inter-application isolation for ITC in a multi-stage parallel processing system shared dynamically among multiple application programs.

DETAILED DESCRIPTION

FIGS. and related descriptions below provide specifications for embodiments and aspects of hardware-logic based systems and methods for inter-task communications (ITC) with destination task defined source task prioritization, for architecture-based application performance isolation for ITC in multi-stage manycore data processing system, as well as for input data availability based prioritization of instances of a given application for execution on processing cores of a processing stage.

The invention is described herein in further detail by illustrating the novel concepts in reference to the drawings. General symbols and notations used in the drawings:

- Boxes indicate a functional module comprising digital hardware logic.
- Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.
- A dotted line marks a border of a group of drawn elements that form a logical entity with internal hierarchy.
- An arrow reaching to a border of a hierarchical module indicate connectivity of the associated information to/from all sub-modules of the hierarchical module.
- Lines or arrows crossing in the drawings are decoupled unless otherwise marked.
- For clarity of the drawings, generally present signals for typical digital logic operation, such as clock signals, or enable, address and data bit components of write or read access buses, are not shown in the drawings.

General notes regarding this specification (incl. text in the drawings):

- For brevity: 'application (program)' is occasionally written in as 'app', 'instance' as 'inst' and 'application-task/instance' as 'app-task/inst' and so forth.
- Terms software program, application program, application and program are used interchangeably in this specification, and each generally refers to any type of executable computer program.
- In FIG. 4, and through the related discussions, the buffers 260 are considered to be First-in First-Out buffers (FIFO); however also other types than first-in first-out buffers can be used in various embodiments.

Embodiments and aspects of the invention are described in the following with references to FIGS.

Figure 1:
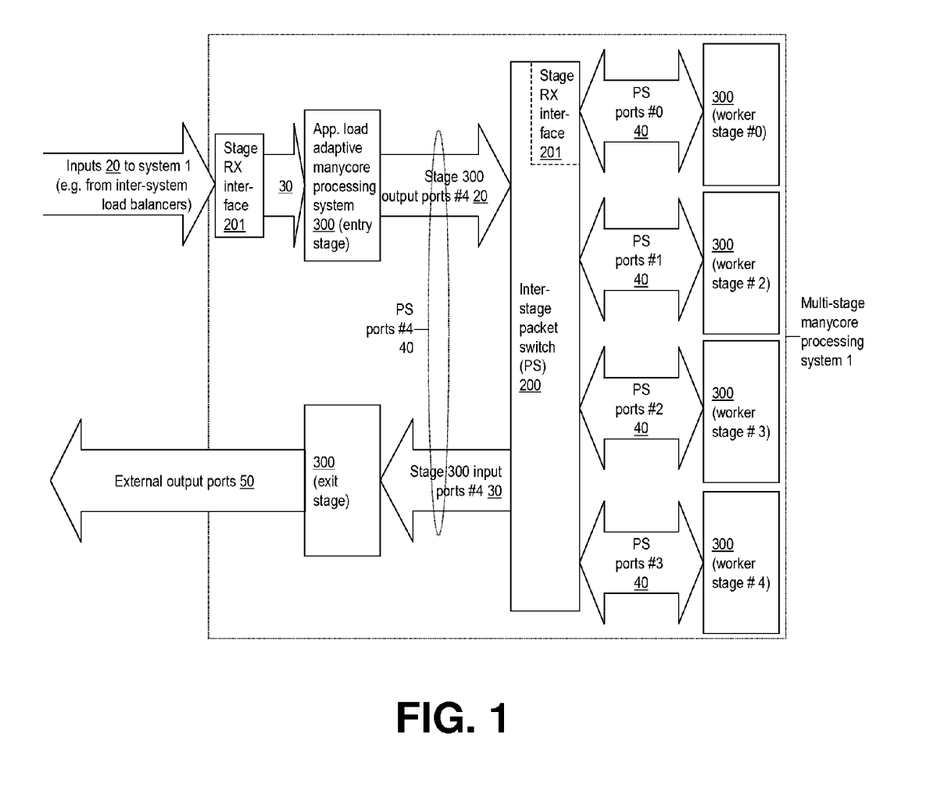
FIG. 1 shows, in accordance with an embodiment of the invention, a functional block diagram for a multi-stage many-core processor system shared dynamically among a set of software programs, with the system providing capabilities for optimally scheduling inter-task communications (ITC) units between various tasks of any one of the programs, as well as scheduling and placing instances of a given program's task for execution on the processing stages of the system, at least in part based on which of the instances have available for them the input data, such as ITC data, needed by them to execute.

FIG. 1 below provides, according to an embodiment of the invention, a functional block diagram for a multistage many-core processor system 1, with hardware logic implemented capabilities for scheduling tasks of application program instances and prioritizing inter-task communications (ITC) among tasks of a given program instance, based at least in part on, for any given app-inst, at a given time, which tasks are expecting input data from which other tasks and which tasks are ready to execute on cores of the multi-stage manycore processing system, with the ready-to-execute status of a given task being determined at least in part based on whether the given task has available to it the input data from other tasks or external inputs 20 so as to enable it to execute at the given time, including producing its processing outputs, such as ITC communications to other tasks or program processing results etc. communications for external parties via external outputs 50. Operation and internal structure and elements of FIG. 1, other than for the aspects described herein, is generally per [8], which the reader may review before this specification for context and background material. For convenience of the reader, a brief summary of the references [5]-[8] is provided as an Appendix 1 of [1].

The system per FIG. 1, focusing primarily on intra-application inter-task communications (ITC) and on scheduling of program task instances for execution based at least in part on availability of input data such as ITC for them, operates in an illustrative scenario as follows:

In the architecture per FIG. 1, the multi-stage manycore processor system 1 is shared dynamically among tasks of multiple application programs (apps) and instances (insts) thereof, with, for each of the apps, each task located at one of the (manycore processor) based processing stages 300. Note however that, for any given app-inst, copies of same task software (i.e. copies same software code) can be located at more than one of the processing stages 300 of a given system 1; thus the architecture per FIG. 1, with its any-to-any ITC connectivity between the stages 300, supports organizing tasks of a program flexibly for any desirable mixes or matches of pipelined and/or parallelized processing.

The detail description of the system 1 here begins by studying the operation of a given port from the inter-stage packet-switch (PS) 200 to a given one of the processing stages 300 (referred to as the local stage). Logic functionality at an interface 201 of the PS, toward a given processing stage 300, for a given port 290 (among the ports 40) is illustrated in FIGS. 2-5. There is a similar interface logic submodule 201 for each of the processing stages it interconnects, even though in FIG. 1 this submodule is drawn only for the interface of the PS toward the processing stage labeled as worker-stage #0. Note that the logic 201 per FIG. 2 (and FIGS. 3 and 4, which present submodules of FIG. 2) can be considered to be part of the processing stage 300 to which the given module 201 interfaces 30 to, rather than an independent module or part of the packet-switch 200. However, in order to simplify the presentation of the inter-stage connectivity in FIG. 1, the stage RX logic modules 201 are presented in FIG. 1 as output interfaces of the PS 200 (with the exception of the RX logic module for the entry-stage). Thus the PS 200 can be understood as a conceptual module, with its constituent parts, i.e., the interfaces 201 to each of the processing stages 300, being in actual implementation the receive (RX) logic modules of the stages 300, according to at least some embodiments of the invention. Note also that there is an input 30 as well as an output bus 20 included with each of the ports 40 in FIG. 1.

Figure 2:
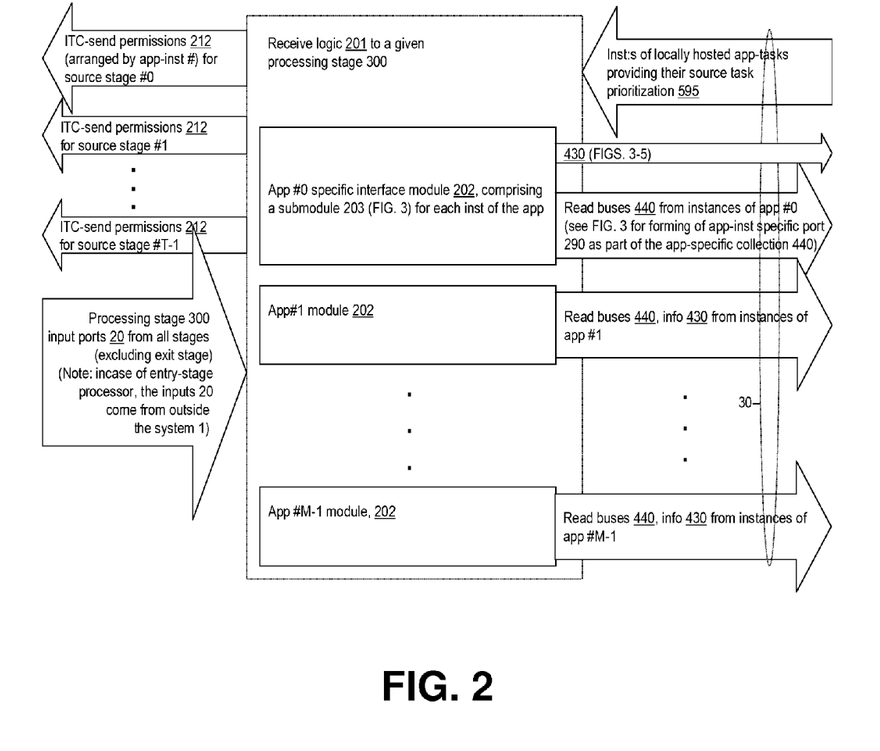
FIG. 2 shows, in accordance with an embodiment of the invention, a functional block diagram for a receive (RX) logic module of any of the processing stages of the multi-stage manycore processor system per FIG. 1.
Figure 3:
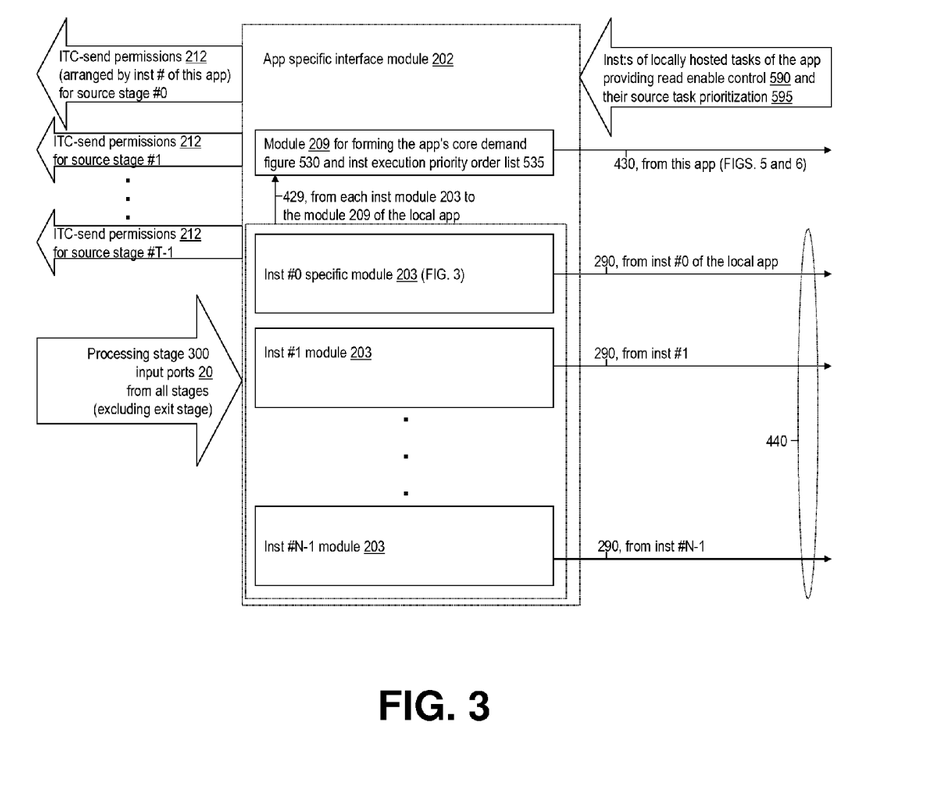
FIG. 3 shows, in accordance with an embodiment of the invention, a functional block diagram for an application program specific submodule of the processing stage RX logic module per FIG. 2.

For any of the processing stages 300, there is an RX logic module 201 per FIG. 2 that forms app specific ITC read port groups 440 (FIG. 3) and app-inst specific ITC read ports 290 (FIG. 4) to its associated processing stage 300. As seen in FIG. 2, the processing stage RX logic module 201 comprises a submodule 202 providing the RX logic for each of the apps hosted at the processing stage. Per FIG. 3, each app-specific stage RX logic module 202 further comprises a set of its app-inst specific submodules 203. This structuring of the ITC logic, to app-inst specific logic resources, provides isolation among the application programs that dynamically share a parallel processing system such as a system per FIG. 1, and brings architectural benefits including inter-application, inter-user and inter-session security as well as predictability of processing performance for each application program instance.

Figure 4:
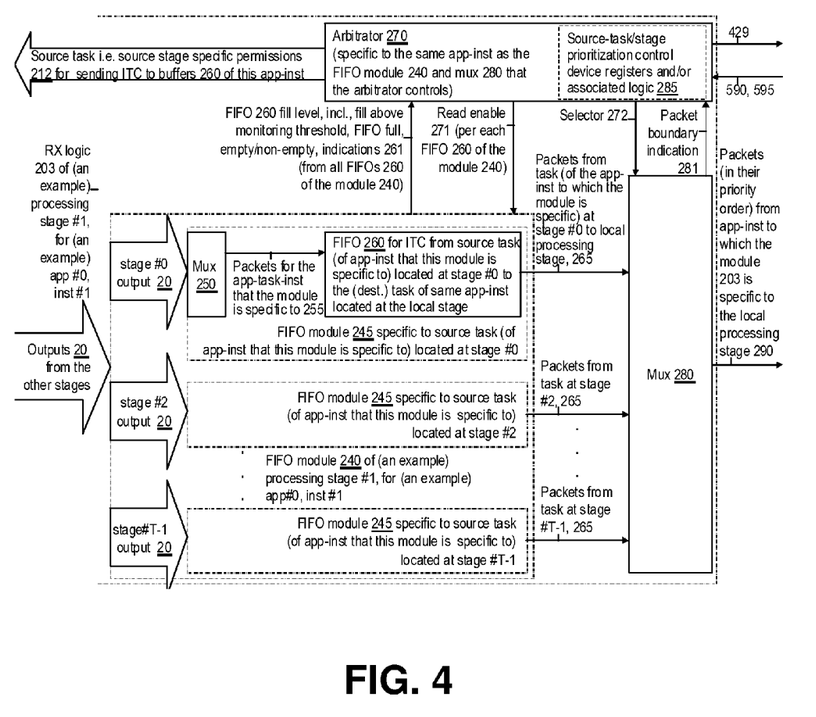
FIG. 4 shows, in accordance with an embodiment of the invention, a functional block diagram for an application program instance specific submodule of the application program specific submodule per FIG. 3.

FIG. 4 illustrates the internal structure and operation of an app-inst specific RX logic 203, which comprises an arbitrator 270, a multiplexer 280 and a set 240 of source tasks specific ITC data buffering modules 245 (with said source tasks being of the same app-inst as the given module 203). The description of operation of the logic per FIG. 4 here (unless otherwise noted) assumes that the module 201 encompassing the module 203 under study is instantiated as the RX logic for a processing stage 300 operating either as worker or exit stage processor within a given system 1. However, same hardware logic of the module 203 (and throughout the module 201) will work also work in the case that the module 201 is instantiated as the RX logic for the processing stage 300 operating as the entry stage processor of the given system 1; the main difference between the cases of a module 201 being instantiated as the RX logic of either worker/exit or entry stage processor is that in the case of the given module 201 serving as the RX logic for the entry stage processor, what are in the following (and in text labels of FIGS. 2-4), in describing the worker/exit stage RX logic operation, referred to as the different source stages/tasks, will in the entry stage instantiation be different input data sources to the system 1 from outside it, e.g. from a row of load balancers between external network inputs and a row of systems 1. Also, normally destination tasks are not identified for packets at input to the entry stage. As such, the app-task-insts at the entry stage processor do not normally configure differing source task or source stage/balancer specific priorities for its RX logic. Accordingly, at entry stage RX logic, the next packet prioritization for muxing 280 is normally based on fill level indications 261 of the muxing input buffers 260, with a goal of preventing buffer overflows.

The app-inst specific RX logic per FIG. 4 takes the outputs 20 from the other stages 300 of the given system 1, and to each of the source task specific buffers 260 of the given app-inst, connects the output bus 20 from the source processing stage hosting the task that any given one of said buffers is specific to. I.e., if there were Y (a positive integer) core specific output ports 210 (FIG. 6) from any given processing stage 300, and T (a positive integer) stages 300 in a given system 1, for any of the app-inst source task specific buffers 260 of the RX logic of the given stage, there will be just Y input ports (at bus 20), rather than T*Y input ports. Because each of these source stage i.e. source task specific RX logic buffers 260 is also specific to a given app-inst, and there will be no more than one core 520 (FIG. 6) allocated at a time to any given app-inst at any of the source stages 300, the source app-inst-task buffer 260 under study will at most get, at any given time, input data from one of its Y input ports (that are connected to it from the source stage 300 hosting the task that the given buffer 260 is specific to). Note though that, because copies of the same task for any app-inst can be located in parallel at any number of (worker) processing stages, the system 1 architecture still supports executing multiple concurrent copies of a given (data parallelizable) task of the same app-inst. Nevertheless, in this architecture there is no need for input port specific buffers at modules 245. This brings substantial architectural benefits via resource efficiency, as well as capacity and performance scalability of the system.

In the worker/exit stage modes, the buses 20 to each of the muxes 250 (FIG. 4) comprise the source core specific output data ports 210 (FIG. 6) that include bits indicating the app-inst that the source core (at its source stage) is presently assigned to process; accordingly these bits identify the destination app-inst for each given packet on any of the ports on the buses 20. Note that for inter-application security, in at least some embodiments of the invention, the app ID bits for each output packet on the core specific output ports 210 of the processor 500 of the system 1 are inserted by the hardware logic of the controller 540 of the applicable processing stages, rather than any user application software; the controller knows the app that is executing at each given core 520 of its processor at any given time since the controller controls 560 which app-insts is to execute on any given one of its local cores on any given core allocation period. Note that the source tasks further signal (via packet OH bits) the destination task within their app-inst for each packet they send over the (conceptual) PS 200. The packets being connected between the processing stages 300 thus identify (via overhead bits) their program instances and destination tasks, and thereby (e.g. via lookup-tables per the example of Table D in the following) the processing stage 300 within a system 1 where any given indicated app task is located. Note that, since at any given processing stage 300, any given app-inst will be assigned for processing at most at one core, at any given time, at most one of the ports 210 at any given one of the source stage specific bus 20 will have a packet destined for the given app-inst that a given (source task specific) module 245 is specific to. Thus, based on the app-inst and destination task indications, carried via e.g. out-of-band or in-band packet overhead bits, the mux 250 selects, from its input bus 20, that one port, if any exists at a given time, which has an active packet transmission to its associated destination task and app-inst for connection to its output 255, and accordingly sets a write enable for a given FIFO 260 to its active value during active transmissions of packets on its output port 255.

In embodiments studied herein in greater detail, the prioritization of input data to any destination app-inst-task is based on the respective priorities assigned 595 by that destination task instance for the individual source tasks (of its app-inst). Since each (copy of a) app-task is located at one of the processing stages (while multiple concurrent insts of each app-task are supported at its local stage), specifying the priority levels of source tasks informs (e.g. per Table D and associated discussion) the priority levels of the source-stage specific FIFOs 260 for selection 272 for reading by a mux 280. The identity of a given source task thus serves as the priority indication of ITC data to the local (destination) task of the app-inst under study from the given source task specific buffer 260. Therefore, for ITC prioritization in this architecture, there is no need for separate buffers for different ITC data priority levels, but instead a single buffer instance 260 is sufficient for each of the source app-inst-task specific modules 245 of the processing stage RX logic per FIGS. 2-4. This further improves the resource efficiency of the presented architecture, and accordingly improves its capacity and performance scalability.

At least in part according to the destination task defined prioritization 595 of source tasks of its app-inst for ITC purposes, each app-inst specific logic module 203 at the RX interface 201 to the given processing stage multiplexes 280 input packets from the source task specific buffers 260 of its app-inst to the local processor, via it's app-inst specific port 290 within the bus 440 (which in turn is part of the TX direction 30 of bus 40 to the local processing stage). According to at least some embodiments of the invention, the destination task defined source task prioritization 595 for ITC will change dynamically over time, based on from which source task(s) the given destination task of the studied app-inst needs ITC data most urgently as its processing state evolves. Naturally a given task of an app-inst can serve both as a source and destination for ITC between the stages 300 of a system 1.

The arbitrator logic 270, in accordance with it communicating 272 to the mux 280 which (if any) of the local FIFOs 260 is selected at any given time for reading a data packet onto the output port 290, enables 271 the data read via the mux input port 265 from the presently selected FIFO 260 instance. The app-inst task under study, when executing on a core of the local processor, provides read enable control 590 through multiplexing module 580 (FIG. 6) to the arbitrator 270 of its own the module 203, and the arbitrator activate will its read enable 217 to the selected FIFO 260 when permitted by that master read enable 590.

Figure 5:
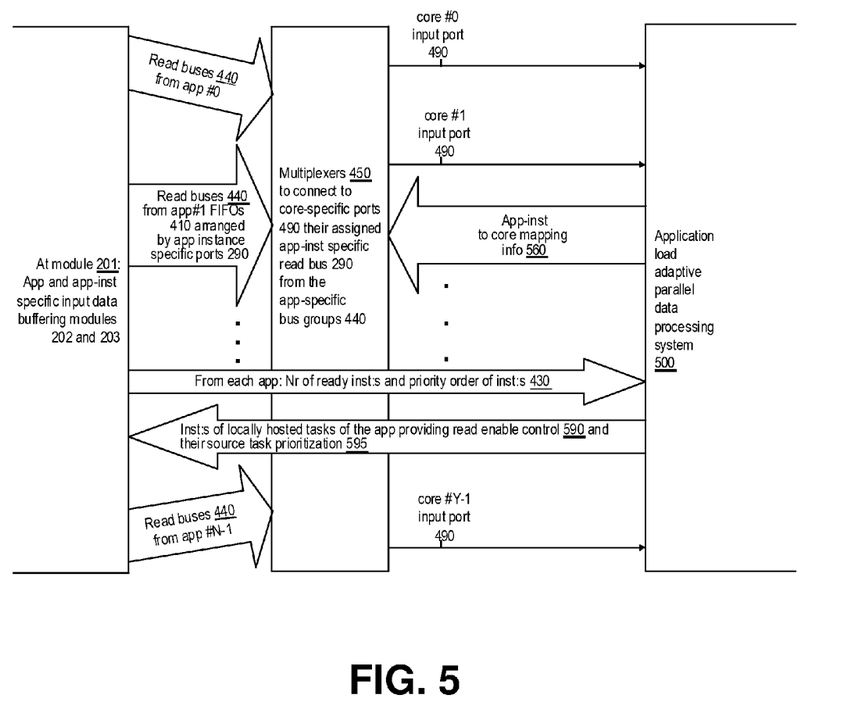
FIG. 5 shows, in accordance with an embodiment of the invention, a functional block diagram for logic resources within one of the processing stages of a system 1 per FIG. 1 for connecting ITC data from input buffers of the RX logic (per FIGS. 2-4) to the manycore processor of the local processing stage.
Figure 6:
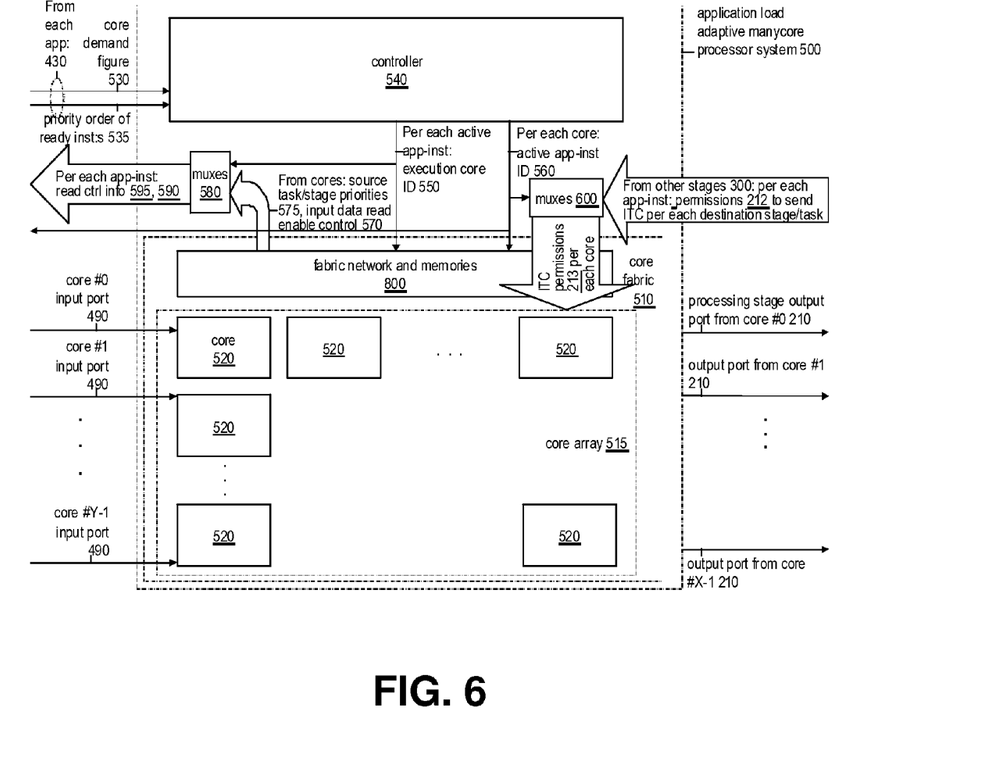
FIG. 6 shows, in accordance with an embodiment of the invention, a functional block diagram for the application load adaptive manycore processor of a processing stage of the multi-stage processing system per preceding FIGS.

Per FIGS. 5 and 6, from the app-inst specific ports 290 among the app-specific buses 440, the core specific muxes 450 connect input packets to the cores 520 of the local processor 500, according to which of the app-insts is assigned at any given time to which of the cores of the array 515. Per FIG. 5, between the processing stage RX logic (FIGS. 2-4) and the manycore processor (FIG. 6) of a processing stage, there is an array of processing core specific multiplexers 450 muxing input data from the app inst specific inputs 440 of the local stage to the cores of the local processor 500 via the core specific input data ports 490 of the processor, according to mapping info 560 from the local processor indicating which of the locally hosted app insts is assigned to any given one of the cores 520 of the processor 500 at any given time.

In at least some embodiments, numbers of ready-to-execute insts (communicated via info flow 430) of the apps hosted at a given processing stage 300 drive at least in part the repeatedly performed allocations of the cores 520 of the given processing stage among such apps. Further, in at least some embodiments of the invention, the number of insts of an app considered to be ready-to-execute is based on at least in part on which of the insts of the app have available to them at their input buffers 260 ITC data from source tasks that the locally hosted (destination) task of the app deems 595 to be a high priority for it to process. E.g., in an embodiment, a (destination) app-task inst is considered ready-to-execute when it has input data at its buffers 260 from one or more source tasks (of the same app-inst) that said destination task has defined 595 as high priority for ITC; in such an embodiment, any other insts are considered as not ready to execute. In an alternative embodiment, a (destination) app-task inst can be deemed as not ready-to-execute when it has indicated itself as expecting ITC from a given source task (by configuring 595 that source task as high priority for ITC) while it has no input data available from that given high priority source task; in such embodiments, the other kinds of instances are considered ready-to-execute. In yet another embodiment, insts are considered ready-to-execute when they have any input data at their buffers 260. Further embodiments implement various combinations and variations from the above techniques in determining the number of ready to execute insts, and their respective execution priority order 535, for a given (destination) app-task based on availability of input ITC data to its from its source tasks and their respective priorities for ITC, as defined 595 by the given destination task. In at least some embodiments, the core demand FIG. 530 for a given app (i.e. an expression of how many of the cores 520 of its host processor the app is presently requesting to be allocated to it by the controller 540 of the processor for the next core allocation period) is based at least in part on the number of ready-to-execute insts of the app. Further specifics for prioritization of source tasks for ITC and app insts for execution at a system 1, according to embodiments of the invention, will be discussed in the following, under captions "Embodiments of Intra-App ITC Prioritization Techniques" and "Embodiments of Intra-App Instance Execution Prioritization Techniques".

Per FIG. 4, according to an embodiment of the invention, the arbitrator module 270 of each app-inst specific RX module 203 forms, based on the info 261 from its source task FIFO modules 245 and the prioritization 595 of the source tasks for ITC, an indication 429 of whether that app-inst is ready to execute, as well an execution priority score of the app-inst. In an embodiment, the execution priority score of an app-inst is based on weighted sum of its non-empty buffers belonging to source tasks of different priorities, with such priorities assigned 595 for the individual source tasks by the local (destination) task of the app-inst. In certain embodiments, in addition to the non-empty buffers 260 of the high ITC priority source tasks having a greater impact on the priority score of the app-inst (signaled to app-level via the info flow 429), also any buffers 260 whose fill level is above a set monitoring threshold, are given greater weight in forming the priority score than other buffers of tasks of the same priority level. From the inst specific indications 429, the logic 209 (FIG. 3) at the app-specific RX module 202 counts the number 530 of its ready-to-execute insts and forms the execution priority order 535 of those insts, and signals these to the controller 540 of the local processor, via info flow 430.

According to its periodic allocations and assignments of the array 515 of cores 520 of the local processor 500, the controller 540 (FIG. 6) maintains control signals 550, 560 that direct the proper information connectivity through the core fabric 510 memory and network subsystem 800 as well as at the mux 580 for input data read control info. Each of the local (destination) task instances, when executing at one of the cores, provides source task/stage prioritization 575, 595 and input data read control info 570, 590, and 575, 595 through the mux 580 to the source task specific buffers 260 of its app-inst. In at least some embodiments, for aspects not herein otherwise described, the multi-stage manycore processing system 1 per FIG. 1 is equal to the system 1 of FIG. 1 of [8] (with the remaining FIGS. and related descriptions of [8] providing further detail for modules shown in FIG. 1, according to at least some embodiments of the invention). Specifically, for descriptions of elements included in the FIGS. of this specification other than what is herein described, please refer to descriptions in [8]. Techniques per [9]-[12] can also be used in some embodiments. References [1]-[4] provide further specifications and implementation scenarios for certain embodiments of the invented techniques.

Embodiments of Intra-App Instance Execution Prioritization Techniques

According to an embodiment of the invention, app-specific logic prioritizes its insts for its execution priority list 535 (FIG. 6, part of info flow 430 shown in FIGS. 2-5) as follows:
First insts of the app are grouped into the following classes, in descending priority order (i.e., inst types are ranked for execution priority in the order they are mentioned in below):
a. Among insts of the app indicated 261 as having data on their FIFOs 260 specific to source tasks that their local (destination) task has indicated currently 595 as high priority for ITC (with these FIFOs referred to as high priority FIFOs, and data on them or expected through them referred to as high priority input data):
  i. Insts indicated 595, 285 as not able to otherwise execute, before processing high priority input data from other task(s).
  ii. Other insts.
b. Among insts indicated 261 as not having high priority input data:
  i. Insts indicated 595, 285 as able to execute presently, even without high priority input data.
  ii. Other insts.
Within each of the above classes, the insts are prioritized (again, in descending priority order) as follows:
a. Insts are prioritized according to their numbers of non-empty high priority source task specific FIFOs 260 (the greater this number is the greater the priority, with a greater priority inst ranked ahead of a lower priority inst for execution).
b. In case of two or more insts having the same priority rank after the above step (within any given class from step 1), such insts are prioritized according to their numbers of non-empty normal priority (i.e. non-high-priority) source task FIFOs (or their numbers of non-empty FIFOs across all source task priority classes, which leads to same result).
c. In case of two or more insts having the same priority rank after the above steps, such insts are prioritized based on their inst ID numbers.

In at least some embodiments of the invention, each given app-inst specific RX module signals 429 (FIG. 4) to its encompassing app-specific RX module 202 (FIG. 3) its priority rank. The signal 429 comprises two parts: (a) an indication of in which of the priority classes a.i through b.ii per above the given app-inst presently is; and (b) the present number of non-empty FIFOs 260 at the given app-inst module 203. For the part (a), in a particular implementation, the classes a.i through b.ii are identified with linearly incrementing integer values, starting from value 0 for class a.i. In a particular embodiment, the arbitrator 270 of the app-inst module 203 determines its priority rank class based on the availability info 261 of input data at its source task specific buffers 260 and the ITC priorities of its source tasks as assigned 595 for it by the task of the given app-inst located at the local processing stage. The logic 209 at the app-level module 202 (FIG. 3) can consider, for example, all other types of instances, except the insts signaled 429 to be in the class b.ii, as ready to execute (i.e., in such logic implementation, a given app-inst is considered as ready to execute unless the given app-inst is indicated 595 to be in a state where it cannot execute without receiving input data from certain (at the time) high priority source task(s) and while the buffers 260 of such high priority source tasks of that app-inst are indicated 261 to be empty).

According to another embodiment of the invention, the module 209 (FIG. 3) arranges the insts of the local app for the inst execution priority list 535 in their descending order of their priority scores computed for each inst based on their numbers of FIFOs 260 (FIG. 4) of differing fill levels 261 and ITC prioritizations 595. To describe the forming of priority scores for these embodiments, we first define (a positive integer) H as the number of non-empty FIFOs 261 of the given inst whose associated source stage was assigned 595 a high ITC priority (by the task of the given app-inst hosted at the processing stage under study). We also define L as the number of other (non high ITC priority source task) non-empty FIFOs 261 of the given inst. With H and L thus defined, the priority score for a given inst specific module 203 (of the present app) is formed, in at least some embodiments, by a formula as follows: if for a given inst H greater than 0, the priority score of the inst is the total number of processing stages in the system 1 less 1 plus H, and otherwise L. In alternative embodiments, the execution priority scores for the insts of a given app-task are computed as weighted sums of H and L, with H given a higher weight for the score. In case of a tie among modules 203 for the greatest priority score value, the arbitrator can use source stage index values of such modules to break the tie, using a revolving starting stage number to find the winning module (e.g. the tied stage closest by its stage index difference to the revolving starting stage).

Per FIGS. 2-6, by monitoring its instances per above, the app-specific RX logic 209 at the app-level module 202 (FIG. 3) sums up the number of insts of the app deemed as ready to execute based on their input data availability and signals 430 to the controller 540 of its local manycore processing stage 300 the number of ready-to-execute insts 530 of its app-inst and the execution priority order list 535 of its app-insts. Based at least in part on these indications 430 from the apps, the controller 540 (FIG. 6) periodically allocates the cores 520 of the local manycore processor 500 among the apps and assigns a specific selected app-inst for each given one of the cores. Each app-inst, when assigned for execution at one of the cores, provides read enable 570, 590 and source prioritization 575, 595 control to its own RX logic module 203.

Embodiments of Destination Task Defined Intra-App ITC Prioritization Techniques

A given app-task inst software, when executing on a core 520, for purposes of controlling its receive direction inter-task communication, writes 595 (FIGS. 2-6, part of info flow 590 shown in FIG. 6), when a need arises, the updated prioritizations for the source tasks of its app-inst to its app-instance specific device registers 285 (FIGS. 2-4) at its RX module 203. In certain embodiments, a given app-task software prioritizes the source tasks (of the same app-inst) for receiving ITC based on which source tasks' output data the given destination task needs most urgently at any given time. Note that in some embodiments, the app-inst specific registers 285 are located at a centralized module for the given processor 500, and their contents are wired 595 to the modules 203 of their associated app-insts from such centralized module (where the cores of the processor have a write access to).

For example, a given task (of an app inst hosted at a system 1) can rank its source tasks for communication prioritization, in descending priority order (i.e. in the order they are mentioned below), and write 595 its source task ITC prioritization control registers 285 into appropriate values, as per Table A below. Note that the specifics of Tables A-D in the following are provided just as illustrative practical examples of possible implementation scenarios; various embodiments can implement various types of modifications, extensions and simplifications of these concepts. For instance, various embodiments can have less or more prioritization levels than the example of four levels in these tables, as well as differing semantics of the prioritization levels. In a simplistic implementation, there will be just two prioritization levels (high and normal) in Table A so that Tables B and C would be reduced to just single rows i.e. vectors with bits indicating whether a given source task or source stage has the stated property true or false for high prioritization level; if the property for high prioritization level is not true, then the sole remaining (opposite) alternative is true and thus no second row is needed.

TABLE A

| Priority level presently assigned by a destination app-task-inst for any given source task (of the same app-inst) from which it can receive data from other stages 300 of system1 (of FIG. 1) | Value that a given destination app-task-inst configures for the device register 285 associated with a given source task, based on which of the priority levels (per the left column) the destination app-task-inst presently assigns to that source task: |
|---|---|
| Tasks from which more high priority data is expected | 0 (top priority) |
| Tasks from which more normal, but not high, priority data is expected | 1 |
| Tasks from which more data is allowed | 2 |
| Tasks from which more data is not allowed | 3 (lowest priority) |

Table A above thus gives, according to an embodiment of the invention, the semantics of the value that a destination app-task-inst writes to a device register associated with one of its source tasks (of the same app-inst). For each destination task (of each given app-inst), there will be a similar device register, per Table A semantics, per each of its source tasks able to send it ITC data through the PS 200 (FIG. 1).

Note that in various embodiments of the invention, the muxing logic 203 may use various mappings between the destination task assigned source task prioritizations and the priority classes for the source task specific FIFOs 260. For example, in a given embodiment, the muxing logic is configured to regard as high priority the ITC data available at FIFOs 260 associated with source tasks that the local destination task of the given program instance assigned 595 (via its registers 285) to priority value 0 per Table A, and deem data at other FIFOs 260 as normal priority. In another embodiment, ITC data at FIFOs 260 of source tasks assigned with priority values of 0 or 1 (per Table A) are regarded as high priority, and others as normal priority. In another embodiment still, data at FIFOs of source tasks assigned with priority values of 0 through 2 are regarded as high priority, and others as normal. As well, certain embodiments provide a muxing priority class per each of the prioritization levels that the destination tasks (dynamically) assign for their source tasks, e.g. the four priority levels per the example of Table A. Yet in another embodiment, a source task is either designated 595 as high priority for ITC by the local destination task (of the same app-inst), or otherwise the task is considered a normal priority for ITC. Various further embodiments will use various extensions, simplifications, modifications, and/or combinations of the above prioritization techniques.

In the embodiments studied herein in further detail, either the app-inst software or assisting hardware logic designed for the purpose, reformats the info per registers with Table A semantics to a format per the Table B below:

TABLE B

| Task priority level (per Table A) | Task #0 at this priority level? (0 = no; 1 = yes) | Task #1 at this priority level? (0 = no; 1 = yes) | (Tasks #2 ... T-2) ... | Task #T-1 at this priority level? (0 = no; 1 = yes) |
|---|---|---|---|---|
| 0 (top priority) | 0 or 1 | 0 or 1 | | 0 or 1 |
| 1 | 0 or 1 | 0 or 1 | | 0 or 1 |
| 2 | 0 or 1 | 0 or 1 | | 0 or 1 |
| 3 (lowest priority) | 0 or 1 | 0 or 1 | | 0 or 1 |

The hardware logic at module 285 (FIG. 4) interacting with the info per Table B format furthermore logic-ANDs the bit entries of the Table B with non-empty (logic 1) or empty (logic 0) status indicators 261 of the source stage specific FIFOs 260, according to at which stage the source task associated with the given bit entry of Table B format is located, to produce further register or logic wire values per Table C below:

TABLE C

| Task priority level (per Table A) | Task #0 at this priority level AND its FIFO 260 non-empty? (0 = no; 1 = yes) | Task #1 at this priority level AND its FIFO 260 non-empty? (0 = no; 1 = yes) | (Tasks #2 ... T-2) ... | Task #T-1 at this priority level AND its FIFO 260 non-empty? (0 = no; 1 = yes) |
|---|---|---|---|---|
| 0 (top priority) | 0 or 1 | 0 or 1 | | 0 or 1 |
| 1 | 0 or 1 | 0 or 1 | | 0 or 1 |
| 2 | 0 or 1 | 0 or 1 | | 0 or 1 |
| 3 (lowest priority) | 0 or 1 | 0 or 1 | | 0 or 1 |

According to an embodiment of the invention, the source task from which next ITC packet is multiplexed 280 to the local processor (via a port 290 associated with the given mux 280) is selected by scanning (from left to right) the rows of bits of the Table C for the app-inst, starting from the top priority row (and a revolving task column within it) and moving down as needed until finding a bit at logic '1' (and returning back to top row, if no bit at '1' was found on a given scan of Table C); the first task found with its Table C bit at logic '1' is selected as the task from which to read the next ITC packet onto the port 290. In an embodiment, for any given row of Table C, bits of tasks indicated as having their FIFOs 260 at high fill level are scanned before the others; in such an embodiment, the entries of Table C thus have two bits each: one bit as shown in the above Table C and another bit indicating the fill level of the FIFO. To speed up scanning bits per Table C format, certain embodiments include an additional column for each row providing the result of a binary OR-function of all task-specific bits in the given row, to tell whether there are any bits at logic '1' at a given row (and incase the implementation provides sub rows for the high fill FIFOs, this row-summarization bit mechanism is applicable also for such sub rows). Once the source task for muxing the next ITC packet from FIFOs 260 is thus selected, its associated source processing stage 300 specific module 245 (and the FIFO 260 within it) can be identified using look-up-tables (LUTs) per Table D format as described in the following.

The app-task-inst software or hardware logic modules 201 can use LUTs to resolve the source processing stage 300 where any given source task of any given app is located at. An example of such LUT is shown in Table D below. Such LUT contents (for an example system 1, supporting four apps and four ITC (source) stages and tasks per an app-inst) tell, for any one of the assumed four apps, the ID# of the processing stage within the given system 1 that hosts any queried one of its tasks.

TABLE D

| App # (to right)<br>Task # (below) | 0 | 1 | 2 | 3 |
|---|---|---|---|---|
| 0 (entry-stage task) | 0 | 0 | 0 | 0 |
| 1 | 1 | 2 | 3 | 4 |
| 2 | 2 | 3 | 0 | 1 |
| 3 | 3 | 0 | 1 | 2 |
| 4 | 4 | 1 | 2 | 3 |

From Table D values per above, for instance, it is seen that for app #2, its source task #1 is located at the processing stage #3.

The Table D info can be provided as (destination) app specific (single-column) LUTs, where the entry #t tells the processing stage # at which its task #t is located. Naturally, per any given app(-inst) software or hardware logic sub-module 202 (and 203) of the modules 201, only the column from Table D specific to its own app is needed.

Note that in at least some embodiments, the source task prioritization info 595, as signaled to modules 203, is targeted directly to the source stages; i.e., translation (per Table D columns as discussed above) from source task ID#s to source stage ID#s is done by app-task inst software (or assisting hardware logic) before the app-inst signals the prioritization 595 to its module 203. In such embodiments, the hardware logic per FIGS. 2-6 deals directly with the prioritization info 595 as directed to source stages (and their associated modules 245) of each given app-task-inst, and the prioritizations of the actual source tasks are not visible to the hardware logic handling the prioritizations of source stages for ITC muxing and app-task instances for execution.

According to an embodiment of the invention, a given app-inst software provides (via info flows 575, 595, through mux 580 per FIG. 6) a logic vector 595 to the arbitrator 270 of its module 203 such that has a priority indicator bit within it per each of its individual source stage specific modules 245: while a bit of such a vector relating to a particular source stage is at its active state (e.g. logic '1'), ITC from the source stage in question to the local task of the app-inst will be considered to be high priority, and otherwise normal priority, by the arbitrator logic 270 in selecting the source specific module 245 from where to read the next ITC packet to its local (destination) task of the studied app-inst. In a particular implementation scenario, when selecting from which of the source stage specific modules 245 of the local module 203 to control 272 the mux 280 to read the next ITC packet to the local processor over the port 290, the arbitrator 270 selects the module 245 (within the module 240 of the local module 203) for reading the next packet per the following source priority ranking algorithm:

The logic uses a revolving (incrementing by one at each run of the algorithm, and returning to 0 from the maximum index) starting source stage number to begin the search of the next source stage for reading an ITC packet. The source priority ranking logic maintains three logic vectors as follows:

1) A bit vector wherein each given bit indicates whether a source stage of the same index as the given bit is both assigned 595, 285 a high priority for ITC (to the task of the studied app-inst located at the local processing stage) and has its FIFO 260 fill level above a configured monitoring threshold;
2) A bit vector wherein each given bit indicates whether a source stage of the same index as the given bit is both assigned a high priority for ITC (to the task of the studied app-inst located at the local processing stage) and has its FIFO 260 non-empty;
3) A bit vector wherein each given bit indicates whether a source stage of the same index as the given bit has its FIFO 260 fill level above the monitoring threshold; and
4) A bit vector wherein each given bit indicates whether a source stage of the same index as the given bit has data available for reading.

The logic also forms (by logic OR) an indicator bit for each of the above vectors telling whether the vector associated with the given indicator has any bits in its active state. From these indicators, the algorithm searches the first, starting from vector 1) toward vector 4), vector that has one or more active bits; the logic keeps searching in loop until such a vector is detected. From the detected highest priority rank vector with active bit(s), the algorithm scans bits, starting from the current starting source stage index (and after reaching the max bit index of the vector, continuing from bit index 0), until it finds a bit in an active state (e.g. logic '1'); the index of such found active bit is the index of the source stage that the arbitrator controls 272 the mux 280 to read its next ITC packet for the local task of the studied app-inst. Various further embodiments can implement various modifications, simplifications or extensions of this selection algorithm, e.g., such that have multiple FIFO 260 fill level monitoring threshold levels and/or multiple source task/stage prioritization levels.

The ITC source task prioritization info from the task software of app-insts to their modules 203 can change dynamically, as the processing state and needs of input data for a given app-inst task evolves over time, and the arbitrators 270 apply the current state of the source task prioritization info 595 provided to them in selecting from which of the source stages to multiplex out the next ITC packet over the port 290 of the given module 203.

In an simplistic embodiment of the module 203 (FIG. 4), the arbitrator of the app-inst specific module 203, at packet boundaries (indicated by the mux 280 to the arbitrator 270 via the signal 281) prioritizes its source task specific FIFOs 260 for selection for muxing out the next packet at the port 290 as follows:

1) Among any non-empty high priority source task FIFOs 260 at the module 203, the FIFO to read is selected based on its associated stage number (e.g., the lower the stage index number, the greater the priority). A high priority FIFO herein refers to a FIFO 260 of such source stage specific module 245 that the source task of the app-inst at its source stage is configured 595 as high-priority for ITC by the task of the app-inst located at the local stage 300 of the given module 203.

2) In case there are not any non-empty high priority FIFOs at the module 240, the FIFO to read is selected, among any non-empty normal priority source task FIFOs, simply based on the source stage ID number (e.g. the lower ID#s have a greater priority), in an embodiment, first among any FIFOs whose fill level is indicated 261 to be above by a set monitoring threshold, and among the other (lower fill level, non-empty) FIFOs in case of absence of the above-threshold FIFOs 260 for the studied app-inst at the given time.

Embodiments of Intra-App ITC Flow-Control Techniques

Per each given port 290 from a given module 201 (FIGS. 1 and 2-5) to its adjacent processing stage 300, arbitrator logic 270 at each given app-inst sub-module 203 of the module 201 monitors 261 whether the fill level of any of the FIFOs 260 of the given module 203 is above a set monitoring threshold. In response to such monitoring, according to at least some embodiments of the invention, the arbitrator 207 denies the permit 212 to send ITC to its associated app-inst task to such source tasks of the app-inst whose associated FIFOs 260 have their fill levels 261 above a defined monitoring threshold, while it grants the permit 212 to other source tasks of its app-inst. Per FIG. 6, any given (source) task, when assigned for execution at a core at the processing stage where the given task is located, receives the ITC sending permission signals 213 from each of the other (destination) tasks of its app-inst through multiplexers 600, which, according to the control 560 from the controller at that processing stage identifying the active app-inst for each execution core, connect the incoming ITC permission signals 212 from the other stages 300 of the system 1 to the cores 520 at that stage. In particular, the muxing module 600 comprises core specific muxes, each of which connects 213 to its associated core 520 the incoming ITC send permit signals 212 from the (destination) tasks of the app-inst assigned 560 at the time to the given core located at the other stages of the system. In an embodiment, the (destination) task logic modules 203 set the ITC permission signals 212 to its active state (e.g. logic '1') when the source task for which the given signal 212, 213 is directed to is permitted to send further ITC data to that destination task of its app-inst, while that logic sets the discussed signal 212, 213 to inactive state (e.g. logic '0') otherwise. The signal buses 212 will naturally be connected through a system 1 between app-inst specific modules 203 of the RX logic modules of the destination processing stages 300 and the muxes 600 of the source processing stages (wherein a given stage will be both a source and destination for ITC as illustrated in FIG. 1); however, to keep the FIG. 1 simpler and clearer, the inter-stage connections of the ITC flow control signals 212 are not shown in it. The starting and ending points of the of the signals 211 are shown, in FIG. 4 and FIG. 6 respectively, while the grouping of these ITC flow control signals according to which processing stage 300 the given signal group 212 is directed to, as well as forming of the stage specific signal groups according to the app-inst # that any given ITC flow control signal 212 concerns, are illustrated also in FIGS. 2 and 3. In connecting these per app-inst ID# arranged, stage specific groups of signals 212 (FIG. 2) to any of the processing stages (FIG. 6), the idea is that, at arrival to the stage that a given set of such groups of signals 212 is directed to, the signals from said groups are re-grouped to form, for each of the app-inst:s hosted on the system, a bit vector where a bit of given index indicates whether the task of given app-inst (that the given bit vector is specific to) hosted at this (source) stage under study is permitted at that time to send ITC data to its task located at the stage ID# of that given index. In some embodiments, info per Table D format is used to form these app-inst specific ITC send permission bit vectors so that each given bit in them informs whether the studied task of the app-inst is permitted to send ITC to the task of that app-inst with task ID# equal to the index of the given bit. With the incoming ITC flow control signals 212 thus organized to app-inst specific bit vectors, the core specific muxes 600 are able to connect 213 to any given core of the local array 515 the ITC flow control bit vector of the app-inst presently assigned 560 for execution at the given core at the time. By monitoring the destination stage or task specific bits of the bit vector 213 thus connected to the present execution core of a task of the studied app-inst located at the (source) processing stage under study (at times that the given app-inst actually is assigned for execution), the task will be able to know to which of the other tasks of its app-inst ITC sending is permitted at any given time.

Note further that is certain embodiments, the FIFO fill-above-threshold indications 261 from the source stage specific FIFOs 260 of the app-inst specific submodules 203 of the RX logic 201 modules of the (ITC destination) stages 300 of the system 1 are wired 212 directly as ITC send permission indication signals to the appropriate muxes 600 of the (ITC source) stages, without going through the arbitrator modules 270 (of the modules 203 at the ITC destination stages). Naturally, an ITC permission signal 212 indicating that the destination FIFO 260 for the given ITC flow 210 has its fill level presently above the configured monitoring threshold is to be understood by the source task for that ITC flow as a denial of the ITC permission (until the signal 212 would turn to indicate that the fill level of the destination FIFO is below the configured ITC permission activation threshold).

In at least some embodiments, each source task applies these ITC send permissions 213 from a given destination task of its app-inst at times that it is about to begin sending a new packet over its (assigned execution core specific) processing stage output port 210 to that given destination task. In such embodiments, the FIFO 260 monitoring threshold for allowing/disallowing further ITC data to be sent to it (from the source task that the given FIFO 260 is specific to) should be set to a level where the FIFO still has room for at least one full ITC packet worth of data bytes, with the size of full ITC packet being configurable for a given system 1 implementation. In certain embodiments, the tasks can be configured to limit the maximum length of ITC packets they send while their ITC send permit to the destination task of the packet being transmitted is denied. In such embodiments, the notion of a maximum length ITC packet can be accordingly limited for the purposes of setting the FIFO 260 fill level threshold above which the ITC send permit for the associated source task will be denied.

Per the foregoing, the invented ITC source prioritization, program instance execution prioritization and ITC flow control techniques provide effective program execution optimization capabilities for each of a set of individual programs configured to dynamically share a given data processing system 1 per FIG. 1, without any of the programs impacting or being impacted by in any manner the other programs of such set. Moreover, for ITC capabilities, also the individual instances (e.g. different user sessions) of a given program are fully independent from each other. The invented techniques and architecture thus provide effective performance isolation between individual programs among groups of programs running on dynamically shared parallel computing hardware.

The functionality of the invented systems and methods described in this specification, where not otherwise mentioned, is implemented by hardware logic of the system (wherein hardware logic naturally also includes any necessary signal wiring, memory elements and such).

Generally, this description and drawings are included to illustrate architecture and operation of practical embodiments of the invention, but are not meant to limit the scope of the invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the invention. Moreover, the system elements and process steps, though shown as distinct to clarify the illustration and the description, can in various embodiments be merged or combined with other elements, or further subdivided and rearranged, etc., without departing from the spirit and scope of the invention. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A hardware logic system for communications among tasks of a software program, the system comprising:
    a collection of source task specific buffers for buffering communication units, called packets, directed to a given task, referred to as a destination task, of the program; and
    hardware logic for selecting a buffer among the collection of buffers from which to transfer a next packet to the destination task, with the selecting done at least in part based on a priority rank for each of the buffers,
    wherein the priority rank for a given one of the buffers is based at least in part on a prioritization of a source task that the source buffer is specific to, with the prioritization assigned by the destination task.

2. The system of claim 1 wherein the priority rank for a given one of the buffers is based at least in part on a measure of a fill level of the buffer, with the measure of the fill level of the buffer comprising an indication of whether the buffer i) is non-empty or ii) has its fill level above a defined monitoring threshold.

3. The system of claim 1 further comprising:
    hardware logic maintaining a hardware signal indicating whether communications to a given buffer, among the source task specific buffers, is permitted presently, with such logic setting the signal in a state indicating said communications being permitted when a fill level of the buffer is below a defined threshold, and with such signal being provided to that one of the tasks of the program for which the given buffer is specific to.

4. A method for prioritizing communications among tasks of a software program, the method involving:
    determining, for a given one of the tasks, referred to as a destination task, from which of the other tasks, referred to as source tasks, the destination task is expecting input data; and
    assigning a prioritization by the destination task for one or more of the source tasks, for purposes of resolving an order of transferring their respective communications from their associated source task specific buffers to the destination task, based at least in part on the determining, so that, in case the destination task is determined to be expecting input data from one but not the other of any two of the source tasks that otherwise would be assigned same prioritization, the task from which the destination task is expecting input data is assigned a higher prioritization than the other;
    wherein at least one of the steps of determining and assigning is performed by hardware logic.

5. The method of claim 4 wherein the assigning is done by setting a hardware signal associated with a given one of the source tasks to a state that represents the prioritization of the given source task.

6. The method of claim 5 wherein the state that represents the prioritization of the given source task is a binary state that indicates whether or not the given source task has a high priority for the purposes of resolving an order of transferring communications to the destination task.

7. The method of claim 5 wherein the state that represents the prioritization of the given source task identifies whether that given source task has the highest priority among the source tasks for the purposes of resolving an order of transferring their respective communications to the destination task.

8. The method of claim 4 wherein the assigning involves writing, by the destination task, a value to a hardware device register associated with a given one of its source tasks, with said value specifying the prioritization of the given source task for purposes of sending communications to the destination task.

9. The method of claim 4 further comprising: multiplexing communications data units to the destination task from the source task specific buffers, wherein which of the source task specific buffers is selected as the one from which a next one of the data units is multiplexed to the destination task is determined at least in part based on the prioritizations of those of the source tasks that at that time have data at the buffers specific to them.

10. The method of claim 4 wherein the assigning is done according to which of the following classes, listed in their descending priority order, any given one of the source tasks belongs to:
    1) source tasks from which new data is expected by the destination task; and
    2) other source tasks.

11. A method for communications among tasks of a software program in a system comprising a collection of source task specific buffers for buffering communication units, called packets, directed to a given task, referred to as a destination task, of the program, the method comprising:
    selecting a buffer among the collection of buffers from which to transfer a next packet to the destination task, with the selecting done at least in part based on a priority rank for each of the buffers; and assigning the priority rank by the destination task for a given one of the buffers based at least in part on a prioritization of a source task that the source buffer is specific to;

wherein at least one of the steps of selecting and assigning is performed by hardware logic.

12. The method of claim 11 wherein the priority rank for a given one of the buffers is based at least in part on a measure of a fill level of the buffer, with the measure of the fill level of the buffer comprising an indication of whether the buffer i) is non-empty or ii) has its fill level above a defined monitoring threshold.

13. The method of claim 11 further comprising:

hardware logic maintaining a hardware signal indicating whether communications to a given buffer, among the source task specific buffers, is permitted presently, with such logic setting the signal in a state indicating said communications being permitted when a fill level of the buffer is below a defined threshold, and with such signal being provided to that one of the tasks of the program for which the given buffer is specific to.

14. A system for prioritizing communications among tasks of a software program, the system comprising:

a subsystem configured to carry out an act of determining, for a given one of the tasks, referred to as a destination task, from which of the other tasks, referred to as source tasks, the destination task is expecting input data; and a subsystem configured to assign a prioritization by the destination task for one or more of the source tasks, for purposes of resolving an order of transferring their respective communications from their associated source task specific buffers to the destination task, based at least in part on the determining, so that, in case the destination task is determined to be expecting input data from one but not the other of any two of the source tasks that otherwise would be assigned same prioritization, the task from which the destination task is expecting input data is assigned a higher prioritization than the other;

wherein at least one of said subsystems is implemented by hardware logic.

15. The system of claim 14 wherein the hardware logic configured to assign is further configured to set a hardware signal associated with a given one of the source tasks to a state that represents the prioritization of the given source task.

16. The system of claim 15 wherein the state that represents the prioritization of the given source task is a binary state that indicates whether or not the given source task has a high priority for the purposes of resolving an order of transferring communications to the destination task.

17. The system of claim 15 wherein the state that represents the prioritization of the given source task identifies whether that given source task has the highest priority among the source tasks for the purposes of resolving an order of transferring their respective communications to the destination task.

18. The system of claim 14 wherein the hardware logic configured to assign is further configured to write a value to a hardware device register associated with a given one of its source tasks, with said value specifying the prioritization of the given source task for purposes of sending communications to the destination task.

19. The system of claim 14 further comprising: hardware logic configured to multiplex communications data units to the destination task from the source task specific buffers, wherein which of the source task specific buffers is selected as the one from which a next one of the data units is multiplexed to the destination task is determined at least in part based on the prioritizations of those of the source tasks that at that time have data at the buffers specific to them.

20. The system of claim 14 wherein the hardware logic configured to assign is further configured to assign the prioritization according to which of the following classes, listed in their descending priority order, any given one of the source tasks belongs to:

1) source tasks from which new data is expected by the destination task; and
2) other source tasks.

* * * * *